(12) United States Patent
Mandic

(10) Patent No.: US 9,772,855 B1
(45) Date of Patent: Sep. 26, 2017

(54) DISCOVERING NEW BACKUP CLIENTS

(71) Applicant: EMC IP Holding Company LLC, Hopkinton, MA (US)

(72) Inventor: Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 14/138,534

(22) Filed: Dec. 23, 2013

(51) Int. Cl.
*G06F 3/00* (2006.01)
*G06F 9/44* (2006.01)
*G06F 13/10* (2006.01)
*G06F 13/38* (2006.01)

(52) U.S. Cl.
CPC .............. *G06F 9/44* (2013.01); *G06F 9/4411* (2013.01); *G06F 13/102* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,145,094 A * | 11/2000 | Shirriff et al. | 714/11 |
| 6,675,177 B1 * | 1/2004 | Webb | G06F 11/1458 |
| 7,428,633 B2 * | 9/2008 | Park et al. | 713/1 |
| 2007/0180509 A1 * | 8/2007 | Swartz | G06F 9/4406 726/9 |
| 2011/0282998 A1 * | 11/2011 | Johnsson | H04L 29/12283 709/226 |
| 2013/0111262 A1 * | 5/2013 | Taylor et al. | 714/4.11 |

* cited by examiner

*Primary Examiner* — Henry Tsai
*Assistant Examiner* — Aurangzeb Hassan
(74) *Attorney, Agent, or Firm* — Van Pelt, Yi & James LLP

(57) ABSTRACT

A system for discovering new backup clients is disclosed. The system comprises an input interface and a processor. The input interface is configured to receive a notice from a backup client. The processor is configured to provide an indication of the notice and select a configuration mode from a set of available configuration modes.

12 Claims, 4 Drawing Sheets

DISCOVERING NEW BACKUP CLIENTS

BACKGROUND OF THE INVENTION

Configuration of backup services for a network system client on a storage network typically involves creating a client configuration on a backup server. This configuration process can be made simpler for a backup administrator by usage of wizards or even automated, but the backup administrator must first be made aware of the existence of the new client.

BRIEF DESCRIPTION OF THE DRAWINGS

Various embodiments of the invention are disclosed in the following detailed description and the accompanying drawings.

DETAILED DESCRIPTION

Figure 1:
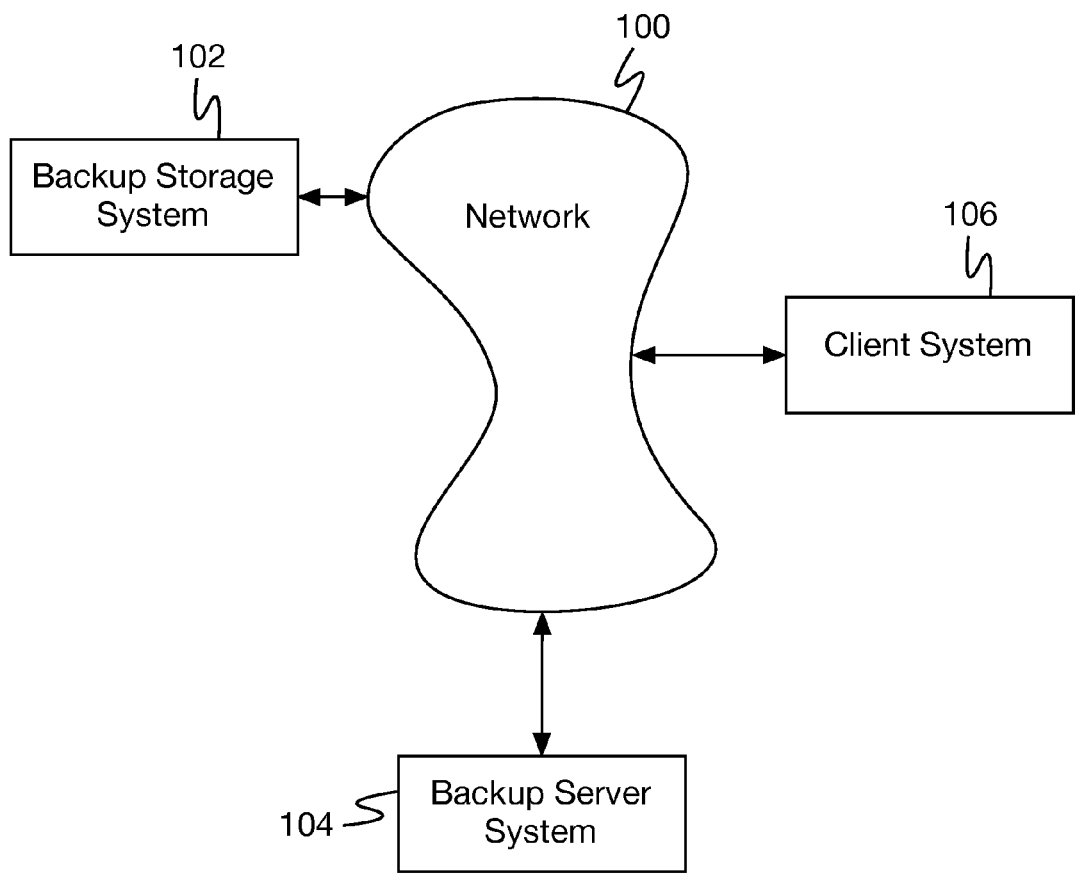
FIG. 1 is a block diagram illustrating an embodiment of a system for discovering new backup clients.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for discovering new backup clients is disclosed. The system comprises an input interface and a processor. The input interface is configured to receive a notice from a backup client. The processor is configured to provide an indication of the notice and select a configuration mode from a set of available configuration modes.

In some embodiments, in a networked backup storage system, when a new backup client is added to the network, it has software installed, including any software deemed required by the organization (e.g., backup client software, antivirus software, monitoring software, etc.). The backup software indicates to a backup server that the client has been added to the network. In various embodiments, the backup software comes configured with a default address for the backup server, a list of potential addresses for a backup server, a process for discovering a backup server in the network of attached servers, or any other appropriate manner of obtaining a candidate backup server. In some embodiments, the backup software prompts the user running the installation for an address for the backup server. In various embodiments, the backup software sends a notification when it is first started up, upon each reboot, whenever a significant software package is installed, or at any other appropriate time. When the backup server receives the notification, it matches it with existing list of configured clients and only if information is new, then it adds it to list of unconfigured clients and the backup administrator is notified of a new or modified backup client on the network. The backup administrator can then provide an indication to the backup server of how to configure the backup client. In various embodiments, the backup client is configured automatically, semi-manually (e.g., a software wizard guides the backup administrator through a manual installation), manually (e.g., by all configuration actions are made by the backup administrator), the backup client is dismissed (e.g., not configured for backup), the existing backup configuration is not changed, or the backup client is configured or not configured in any other appropriate way. In various embodiments, the backup client is configured for a full backup, for a partial backup, for a custom backup type (e.g., for database software), for a manual backup, incremental backups, or for any other appropriate backup type.

FIG. 1 is a block diagram illustrating an embodiment of a system for discovering new backup clients. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106.

Figure 2:
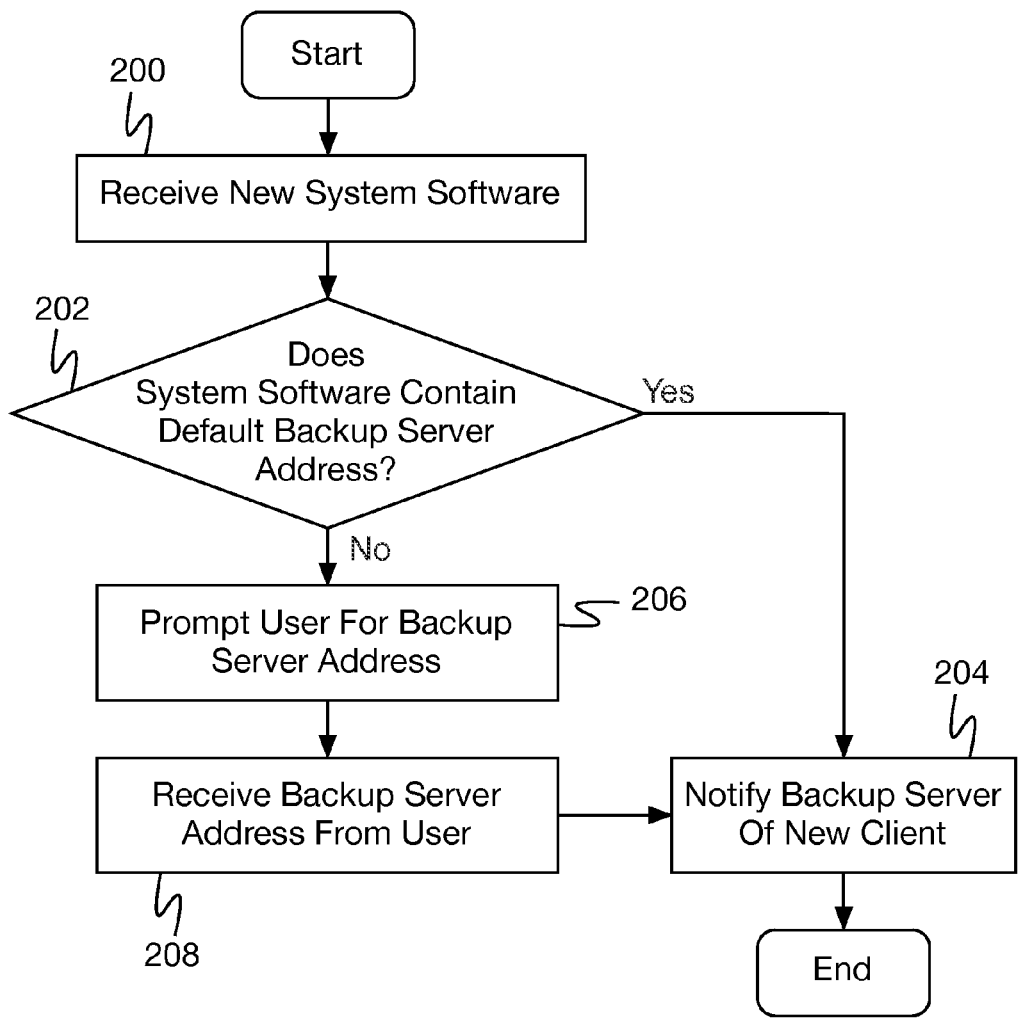
FIG. 2 is a flow diagram illustrating an embodiment of a process for setting up a new client system.

FIG. 2 is a flow diagram illustrating an embodiment of a process for setting up a new client system. In some embodiments, the process of FIG. 2 comprises a process for setting up a client system as in client system 106 of FIG. 1. In the example shown, in 200, new system software is received (e.g., by the client system). In some embodiments, the system software comprises custom system software for the network system (e.g., system software to be installed on a corporate network has been customized by the network administrator in ways specific to the corporate network). In 202, it is determined whether the system software contains a default backup server address. In some embodiments, a default backup server address comprises part of a system software customization. If it is determined in 202 that the system software contains a default backup server address, control passes to 204. In 204, the backup server is notified of the new client. In some embodiments, the notification comprises information describing the client system (e.g., hardware specifications, configuration information, operating system type, installed software, etc.). The process then ends. In some embodiments, in 204, in the event that the backup server cannot be notified at the default backup server address, control passes to 206. If it is determined in 202 that the system software does not contain a default backup server address, control passes to 206. In 206, a user (e.g., a user installing the new system software) is prompted for a backup server address. In 208, a backup server address is received from the user. Control then passes to 204.

In some embodiments, the backup server is notified upon install of system software on the backup client (e.g., an operating system upgrade, etc.). In some embodiments, the backup server is notified upon reboot of the backup client. In some embodiments, the backup server is notified upon installation of software on the backup client (e.g., a new application, a database, an enterprise software module, etc.).

In various embodiments, the alternate address for notification of a backup server is received from a list, a selection of an entry in a list, using an autodiscovery process, or any other appropriate manner of determining an alternate address for notification.

Figure 3:
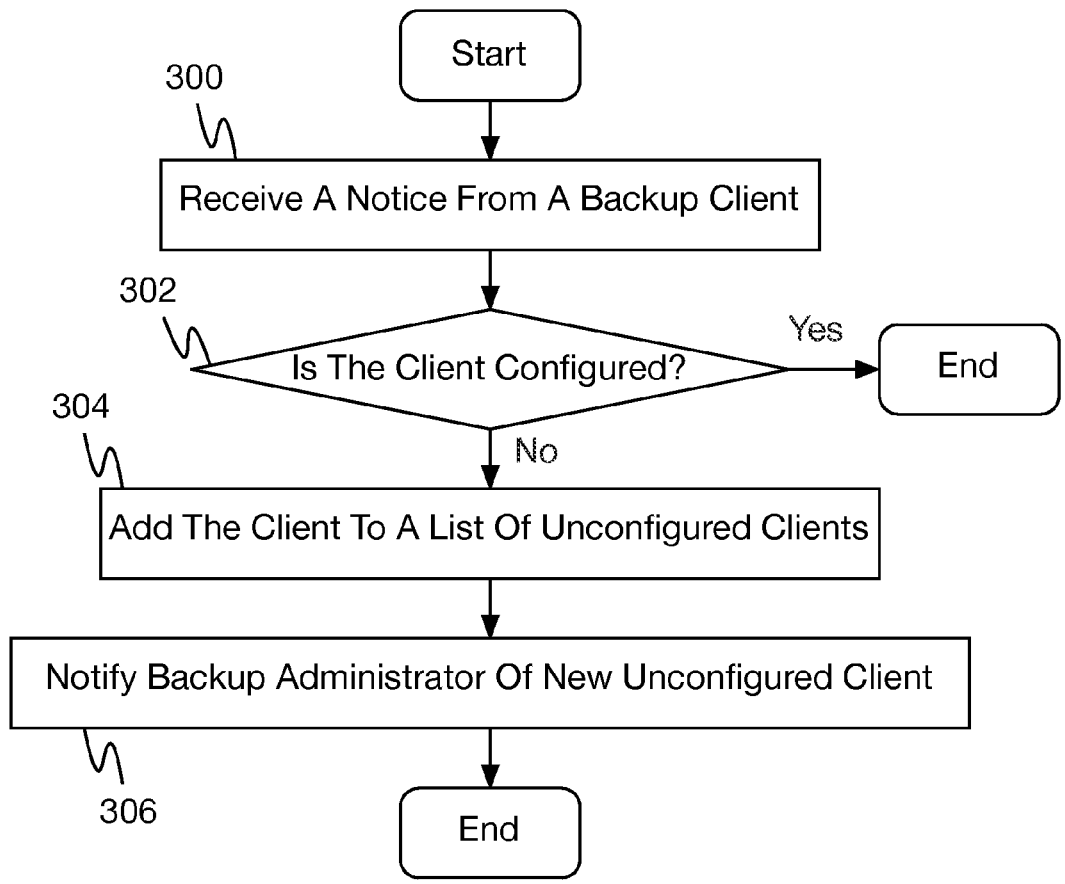
FIG. 3 is a flow diagram illustrating an embodiment of a process for discovering new backup clients.

FIG. 3 is a flow diagram illustrating an embodiment of a process for discovering new backup clients. In some embodiments, the process of FIG. 3 is executed by a backup server system (e.g., backup server system 104 of FIG. 1). In the example shown, in 300, a notice is received from a backup client. In some embodiments, the notice comprises a notice that the backup client is being added to the network (e.g., a notice as is sent by a client system in 204 of FIG. 2). In 302, it is determined if the client is configured. In various embodiments, it is determined if the client is configured by checking a configuration database, a list of configured clients, a configuration status, or any other appropriate configuration information. If it is determined in 302 that the client is configured, the process ends. If it is determined in 302 that the client is not configured, control passes to 304. In 304, the client is added to a list of unconfigured clients. In 306, a backup administrator is notified of a new unconfigured client. In some embodiments, an unconfigured client is configured by the backup administrator. In some embodiments, an unconfigured client is configured at an appropriate time as determined by the backup administrator. The administrator can be prompted for a selection for configuring a new backup client using a manual, semi-manual (e.g., a wizard), automatic process, or no update process. In some embodiments, the list of options for available a configuration processes is based at least in part on the configuration information provided as part of the notice from the backup client. For example, an installation configuration of the client may not be compatible with an automated process (e.g., a complex database installed in the client cannot be configured for backup automatically) so that the automatic configuration option is not presented or is not allowed if selected.

In some embodiments, in the event that the client is determined to be configured in 302, the client is added to a list of configured clients whose configuration has or may have changed, and the administrator is notified that a change in configuration to the client has occurred. The administrator can then be prompted for a selection for updating the backup configuration using a manual, semi-manual (e.g., a wizard), automatic process, or no update process. In some embodiments, the list of options for available update processes is based at least in part on the configuration information provided as part of the notice from the backup client. For example, an installation configuration of the client may not be compatible with an automated process (e.g., a complex database installed in the client cannot be configured for backup automatically) so that the automatic configuration option is not presented or is not allowed if selected.

Figure 4:
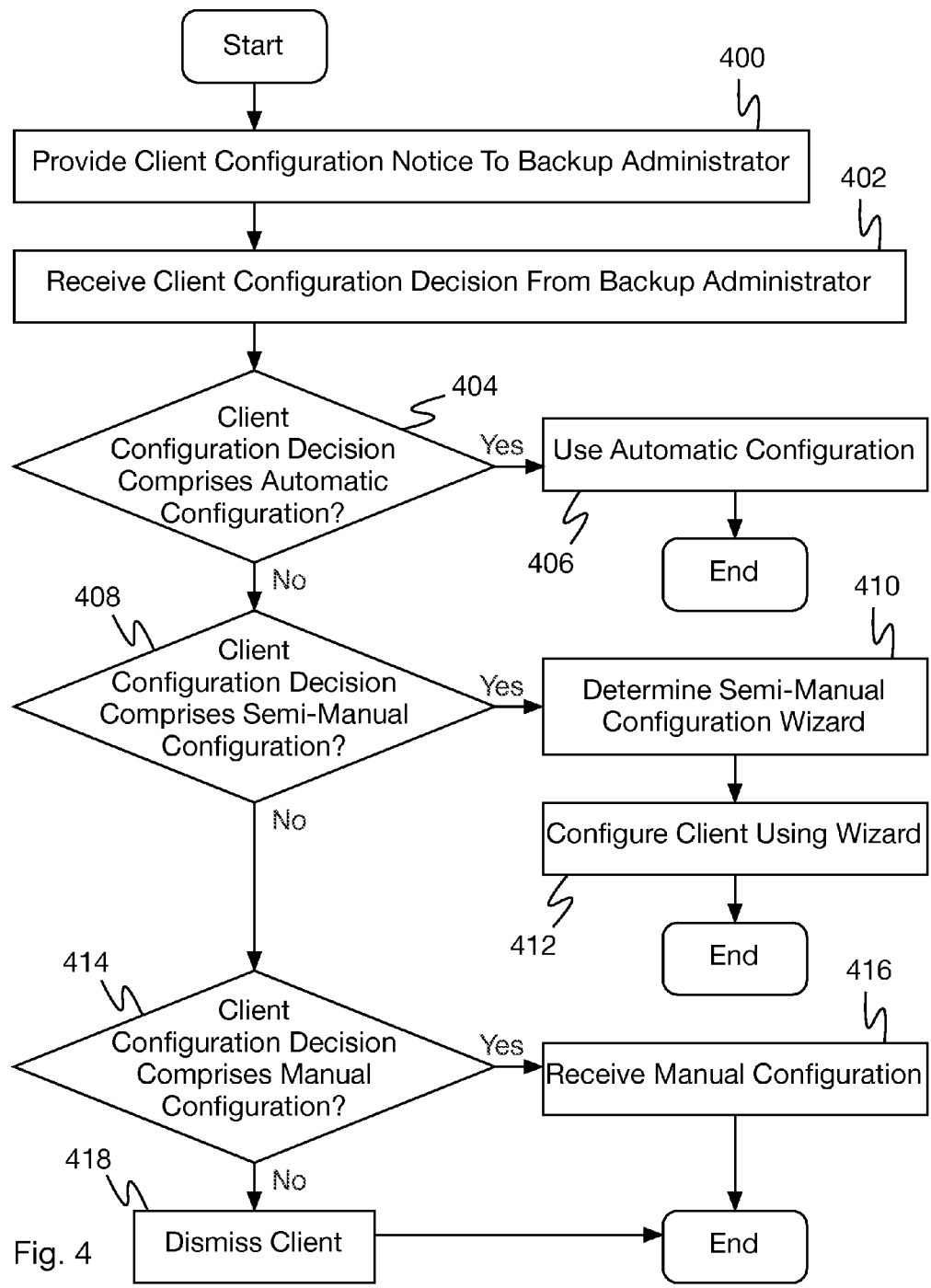
FIG. 4 is a flow diagram illustrating an embodiment of a process for configuring a backup client.

FIG. 4 is a flow diagram illustrating an embodiment of a process for configuring a backup client. In some embodiments, a backup client is configured by a backup administrator. In some embodiments, the process of FIG. 4 is executed by a backup server system (e.g., backup server system 104 of FIG. 1) interacting with a backup administrator. In the example shown, in 400, a client configuration notice is provided to a backup administrator. In some embodiments, the client configuration notice comprises a notice received by the backup server system from a client system. In some embodiments, the client configuration notice comprises information describing the client system (e.g., hardware specifications, operating system type, installed software or applications, etc.). In some embodiments, a backup administrator makes a client configuration decision based at least in part on the information describing the client system. In some embodiments, a backup administrator is presented with options based on the configuration information the client has provided in the notice (e.g., depending on the complexity, the administrator is presented with a subset of the set of possible configuration processes: manual, semi-manual, wizard, automatic, no configuration process, etc.). In 402, a client configuration decision is received from a backup administrator.

In 404, it is determined if the client configuration comprises automatic configuration. In some embodiments, an automatic configuration configures the client system using a default set of configurations that are applicable to a typical client system. In some embodiments, the automatic configuration configures the client using a set of configurations that depend on the configuration information that is provided from the client. For example, a configuration is built automatically based on the information provided by the client system from a preprogrammed set of configurations or using an intelligent automatic configurer. If it is determined in 404 that the client configuration decision comprises automatic configuration, control passes to 406. In 406, the automatic configuration is used, and the process ends. If it is determined in 404 that the client configuration decision does not comprise automatic configuration, control passes to 408. In 408, it is determined whether the client configuration decision comprises semi-manual configuration. In some embodiments, semi-manual configuration comprises configuration by a backup administrator interacting with an automated configuration wizard, allowing the backup administrator choices in the client configuration. In some embodiments, a semi-manual configuration wizard is used when client configuration involves custom configuration for backup of software application data. In some embodiments, different semi-manual configuration wizards are available for configuration of different software applications. For example, the wizard uses information received from the client system to present options to the administrator that are selected from to configure the client for backup. In some embodiments, the wizard probes for and retrieves information from the client system to further provide configuration options to an administrator. If it is determined in 408 that the client configuration decision comprises semi-manual configuration, control passes to 410. In 410, a semi-manual configuration wizard is determined. In various embodiments, a semi-manual configuration wizard is determined based at least in part on a client configuration notice, on a backup administrator decision, on a communication with the client system, or on any other appropriate information. In some embodiments, more than one semi-manual configuration wizard is determined. For example, depending on installed applications, each installed application has a wizard to aid in backup configuration.

In 412, the client is configured using the wizard, and the process ends. If it is determined in 408 that the client configuration decision does not comprise semi-manual configuration, control passes to 414. In 414, it is determined whether the client configuration decision comprises manual configuration (e.g., the client is configured by a backup administrator without automated assistance). If it is determined in 414 that the client configuration comprises manual configuration, control passes to 416. In 416, a manual configuration is received, and the process ends. If it is determined in 414 that the client configuration does not comprise manual configuration (e.g., the client configuration decision comprises no configuration), control passes to 418. In 418, the client is dismissed, and the process ends. For example, the administrator has selected not to configure the client.

In some embodiments, a client configuration comprises a backup fraction (e.g., a fraction of the client system to back up). In various embodiments, a backup fraction comprises a full backup (e.g., all client system data is backed up), a partial backup (e.g., a portion of the client system data is backed up), a special backup (e.g., part of the client system data is backed up in a special way specific to a software database or application e.g., Oracle™, Outlook™, Exchange™, etc.), or any other appropriate backup fraction. In some embodiments, a client configuration comprises a backup frequency (e.g., how often backups are automatically taken). In various embodiments, a backup frequency comprises once an hour, once a day, once a week, or any other appropriate backup frequency. In some embodiments a client configuration comprises a manual backup (e.g., client data is backed up, but no configuration for future automatic backups). In some embodiments, a client configuration comprises a backup retention time (e.g., how long backups are kept). In some embodiments, a backup retention time comprises a decreasing fraction of backups kept as time passes (e.g., backups are taken every day but only one backup/week is kept past one month old and only one backup/month is kept past one year old). In some embodiments, the backup configuration comprises a migration schedule (e.g., time in online connected backup (e.g., an online hard drive system), time in near line connected backup (e.g., in an online tape library), time in off line backup (e.g., stored off site), time for deletion, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for discovering a new backup client, comprising:
    an input interface configured to receive a notice from a backup client over a network, wherein the notice further comprises a hardware and software configuration of the backup client and that the backup client has been added to the network; and
    a processor configured to:
        in response to the notice, determine whether the backup client is already configured to perform backups based at least in part on the hardware and software configuration of the backup client;
        in the event that the backup client is not already configured, provide indication of the notice;
        determine a set of available configuration modes based at least in part on the hardware and software configuration of the backup client, wherein the set of available configuration modes comprises one or more of an automatic configuration mode, a semi-manual configuration mode, and a manual configuration mode;
        select a configuration mode from the set of available configuration modes; and
        configure the backup client according to the selected configuration mode, wherein the selected configuration mode comprises a backup frequency and a backup fraction, wherein the backup fraction comprises one or more of the following: a full backup, a partial backup, a special backup based at least in part on a software application installed on the backup client, a special backup for a specific software application installed on the backup client, or a special backup for a specific database installed on the backup client.

2. The system of claim 1, wherein the notice is received upon installation of system software on the backup client.

3. The system of claim 1, wherein the notice is received upon reboot of the backup client.

4. The system of claim 1, wherein the notice is received upon installation of application software on the backup client.

5. The system of claim 1, wherein the set of configuration modes further comprises no backup.

6. The system of claim 1, wherein the configuration mode is selected based at least in part on a received user input.

7. The system of claim 6, wherein the received user input comprises a selection of a mode from a set of modes.

8. The system of claim 7, wherein the user is provided a display of the set of modes and prompted to select the mode from the set of modes.

9. The system of claim 1, wherein the configuration mode is selected based at least in part on a configuration of the backup client.

10. A method for discovering a new backup client, comprising:
  receiving a notice from a backup client over a network, wherein the notice further comprises a hardware and software configuration of the backup client and that the backup client has been added to the network;
  in response to the notice, determining whether the backup client is already configured to perform backups based at least in part on the hardware and software configuration of the backup client;
  in the event that the backup client is not already configured, providing, using a processor, indication of the notice;
  determining a set of available configuration modes based at least in part on the hardware and software configuration of the backup client, wherein the set of available configuration modes comprises one or more of an automatic configuration mode, a semi-manual configuration mode, and a manual configuration mode;
  selecting a configuration mode from the set of available configuration modes; and
  configuring the backup client according to the selected configuration mode, wherein the selected configuration mode comprises a backup frequency and a backup fraction, wherein the backup fraction comprises one or more of the following: a full backup, a partial backup, a special backup based at least in part on a software application installed on the backup client, a special backup for a specific software application installed on the backup client, or a special backup for a specific database installed on the backup client.

11. A computer program product for discovering a new backup client, the computer program product being embodied in a non-transitory computer readable storage medium and comprising computer instructions for:
  receiving a notice from a backup client over a network, wherein the notice further comprises a hardware and software configuration of the backup client and that the backup client has been added to the network;
  in response to the notice, determining whether the backup client is already configured to perform backups based at least in part on the hardware and software configuration of the backup client;
  in the event that the backup client is not already configured, providing indication of the notice;
  determining a set of available configuration modes based at least in part on the hardware and software configuration of the backup client, wherein the set of available configuration modes comprises one or more of an automatic configuration mode, a semi-manual configuration mode, and a manual configuration mode;
  selecting a configuration mode from the set of available configuration modes; and
  configuring the backup client according to the selected configuration mode, wherein the selected configuration mode comprises a backup frequency and a backup fraction, wherein the backup fraction comprises one or more of the following: a full backup, a partial backup, a special backup based at least in part on a software application installed on the backup client, a special backup for a specific software application installed on the backup client, or a special backup for a specific database installed on the backup client.

12. The system of claim 1, wherein the backup fraction comprises a fraction of the backup client to backup.

* * * * *